US012778155B2

(12) United States Patent
Xu et al.

(10) Patent No.: US 12,778,155 B2
(45) Date of Patent: Nov. 3, 2026

(54) OIL-IN-WATER EMULSION GEL AND PREPARATION METHOD AND USE THEREOF, AND FAT SUBSTITUTE

(71) Applicant: Innovation Center of Yangtze River Delta, ZJU, Jiaxing City (CN)

(72) Inventors: Enbo Xu, Jiaxing City (CN); Jie Li, Jiaxing City (CN); Donghong Liu, Jiaxing City (CN); Qingqing Zhu, Jiaxing City (CN); Huifang Cao, Jiaxing City (CN); Haibo Pan, Jiaxing City (CN); Wenjun Wang, Jiaxing City (CN); Tian Ding, Jiaxing City (CN); Guanchen Liu, Jiaxing City (CN); Jianwei Zhou, Jiaxing City (CN)

(73) Assignee: RIVER DELTA, ZJU (CN)

( * ) Notice: Subject to any disclaimer, the term of this patent is extended or adjusted under 35 U.S.C. 154(b) by 254 days.

(21) Appl. No.: 18/541,844

(22) Filed: Dec. 15, 2023

(65) Prior Publication Data

US 2025/0017230 A1 Jan. 16, 2025

(30) Foreign Application Priority Data

Jul. 11, 2023 (CN) ........................ 202310851598.4

(51) Int. Cl.
*A23D 7/005* (2006.01)
*A23D 7/04* (2006.01)
*B33Y 80/00* (2015.01)

(52) U.S. Cl.
CPC ............... *A23D 7/005* (2013.01); *A23D 7/04* (2013.01); *B33Y 80/00* (2014.12)

(58) Field of Classification Search
CPC ........... A23D 7/005; A23D 7/04; B33Y 80/00
See application file for complete search history.

(56) References Cited

PUBLICATIONS

Zhao et al., "Rheological properties and microstructure of a novel starch-based emulsion gel produced by one-step emulsion gelation: Effect of oil content". Carbohydrate Polymers 281 (2022) 119061. (Year: 2022).*

Lu et al., "Nanostarch: Preparation, Modification, and Application in Pickering Emulsions". from Journal of Agricultural and Food Chemistry, 2021, 6929-6942. (Year: 2021).*

NPL Ge et al., "Characterizations of Pickering emulsions stabilized by starch nanoparticles: Influence of starch variety and particle size". Food Chemistry 234 (2017) 339-347. (Year: 2017).*

(Continued)

*Primary Examiner* — Erik Kashnikow
*Assistant Examiner* — Assaf Zilbering
(74) *Attorney, Agent, or Firm* — David R. Conklin; Kirton McConkie

(57) ABSTRACT

Disclosed are an oil-in-water (O/W) emulsion gel and a preparation method and use thereof, and a fat substitute. The O/W emulsion gel includes: starch nanoparticles with a content of 8 g/L to 40 g/L, curdlan with a content of 10 g/L to 30 g/L, an oil with a volume fraction of 10% to 30%, and water. The O/W emulsion gel could be used to prepare a fat substitute, especially the fat substitute prepared by 3D printing with various complex models.

9 Claims, 7 Drawing Sheets

(56) References Cited

PUBLICATIONS

Ren et al., "Pickering emulsion: A multi-scale stabilization mechanism based on modified lotus root starch/xanthan gum nanoparticles". International Journal of Biological Macromolecules 233 (2023) 123459. (Year: 2023).*

Roberts et al., "The effects of concentration and sodium hydroxide on the rheological properties of potato starch gelatinisation". Carbohydrate Polymers 50 (2002) 133-143 (Year: 2002).*

* cited by examiner

OIL-IN-WATER EMULSION GEL AND PREPARATION METHOD AND USE THEREOF, AND FAT SUBSTITUTE

CROSS REFERENCE TO RELATED APPLICATION

This patent application claims the benefit and priority of Chinese Patent Application No. 202310851598.4, entitled "OIL-IN-WATER EMULSION GEL AND PREPARATION METHOD AND USE THEREOF, AND FAT SUBSTITUTE", filed with the China National Intellectual Property Administration on Jul. 11, 2023, the disclosure of which is incorporated by reference herein in its entirety as part of the present application.

TECHNICAL FIELD

The present disclosure relates to the technical field of food processing, and in particular to an oil-in-water (O/W) emulsion gel and a preparation method and use thereof, and a fat substitute.

BACKGROUND

Traditional solid fats contain more saturated fatty acids, which cause adverse effects on human health. Fat substitutes, such as plant-based fat substitutes obtained from liquid vegetable oils structured with polysaccharide macromolecules, have drawn widespread attention due to desirable fat-like processing properties, sensory properties, and green and health advantages.

3D printing, also known as additive manufacturing, specifically produces products with target models through layer-by-layer deposition. Food 3D printing is a process of manufacturing food using 3D printing. This process shows the advantages of personalized control of nutrition, accurate control of complex structures, digital production, optimization of the food supply chain, and reduction of food waste. In particular, food 3D printing has achieved unprecedented development due to convenient customization and ultra-high degree of freedom.

However, emulsion gels currently used for preparing the fat substitute based on 3D printing have low stability and poor performance in printing high-accuracy models.

SUMMARY

The present disclosure is intended to provide an oil-in-water (O/W) emulsion gel and a preparation method and use thereof, and a fat substitute. In the present disclosure, the O/W emulsion gel has a desirable stability and can be used to prepare a fat substitute. The O/W emulsion gel is particularly suitable for preparing the fat substitute through 3D printing with a high printing accuracy.

To achieve the above object, the present disclosure provides the following technical solutions.

The present disclosure provides an oil-in-water (O/W) emulsion gel, including starch nanoparticles with a content of 8 g/L to 40 g/L, curdlan with a content of 10 g/L to 30 g/L, an oil with a volume fraction of 10% to 30%, and water.

In some embodiments, the starch nanoparticles each have a particle size of 100 nm to 500 nm.

In some embodiments, the curdlan includes at least one selected from the group consisting of carrageenan, xanthan gum, and gellan gum.

In some embodiments, the oil includes at least one selected from the group consisting of soybean oil, corn oil, peanut oil, sesame oil, wheat germ oil, and fish oil.

The present disclosure further provides a method for preparing the O/W emulsion gel described in above technical solutions, including the following steps:

i) mixing the starch nanoparticles with the water to obtain a first mixture, and performing first homogenization on the first mixture to obtain a nanoscale starch dispersion;

mixing the nanoscale starch dispersion with the oil to obtain a second mixture, and performing second homogenization on the second mixture to obtain an O/W emulsion; and mixing the O/W emulsion with the curdlan to obtain a third mixture, and performing gelation on the third mixture to obtain the O/W emulsion gel.

In some embodiments, the first homogenization and the second homogenization are each independently conducted at a rotation speed of 12,000 rpm to 16,000 rpm for 2 minutes to 5 minutes.

In some embodiments, the gelation is conducted at a temperature of 70° C. to 80° C. for 50 minutes to 70 minutes.

The present disclosure further provides use of the O/W emulsion gel described in above technical solutions or the O/W emulsion gel prepared by the method described in above technical solutions in preparation of a fat substitute.

In some embodiments, the preparation of the fat substitute includes performing 3D printing using the O/W emulsion gel.

The present disclosure further provides a fat substitute, which is prepared from the O/W emulsion gel or the O/W emulsion gel prepared by the method described in above technical solutions through 3D printing.

The present disclosure provides an O/W emulsion gel, including: starch nanoparticles with a content of 8 g/L to 40 g/L, curdlan with a content of 10 g/L to 30 g/L, an oil with a volume fraction of 10% to 30%, and water. The starch nanoparticles serve as a stabilizer for the emulsion gel, and are combined with the curdlan to prepare the O/W emulsion gel with better stability. The O/W emulsion gel could be used to prepare a fat substitute, especially the fat substitute prepared by 3D printing with various complex models. The 3D printing shows a high printing accuracy to achieve a desirable fat-simulating effect.

The present disclosure further provides a method for preparing the O/W emulsion gel, including the following steps:

i. mixing the starch nanoparticles with the water, and performing first homogenization to obtain a nanoscale starch dispersion;

ii. mixing the nanoscale starch dispersion with the oil, and performing second homogenization to obtain an O/W emulsion; and iii. mixing the O/W emulsion with the curdlan, and performing gelation to obtain the O/W emulsion gel.

In the present disclosure, the starch nanoparticles and the oil are used as raw materials, and the nanoscale starch dispersion and the O/W emulsion (i.e., a Pickering emulsion stabilized by the starch nanoparticles) are obtained by first and second homogenization, respectively; the O/W emulsion is subjected to gelation under an action of the curdlan to obtain the O/W emulsion gel, thereby achieving structuring of the oil. The O/W emulsion gel prepared by the method has desirable rheological properties and emulsion stability, and could be used to prepare a fat substitute with a controllable structure. The O/W emulsion gel is particularly suitable for preparing the fat substitute through 3D printing, with high printing accuracy and high printing intensity, thereby showing an excellent application potential. In addition, the method according to the present disclosure has a simple and efficient process, does not involve harmful reagents and chemical components, and is environmentally friendly. The method achieves a more stable structured oil system under a lower oil phase proportion, and could realize all or part of the replacement of traditional solid fats, thereby expanding a practical application scope of low-fat healthy fat substitutes in the food field.

DETAILED DESCRIPTION OF THE EMBODIMENTS

Figure 1A:
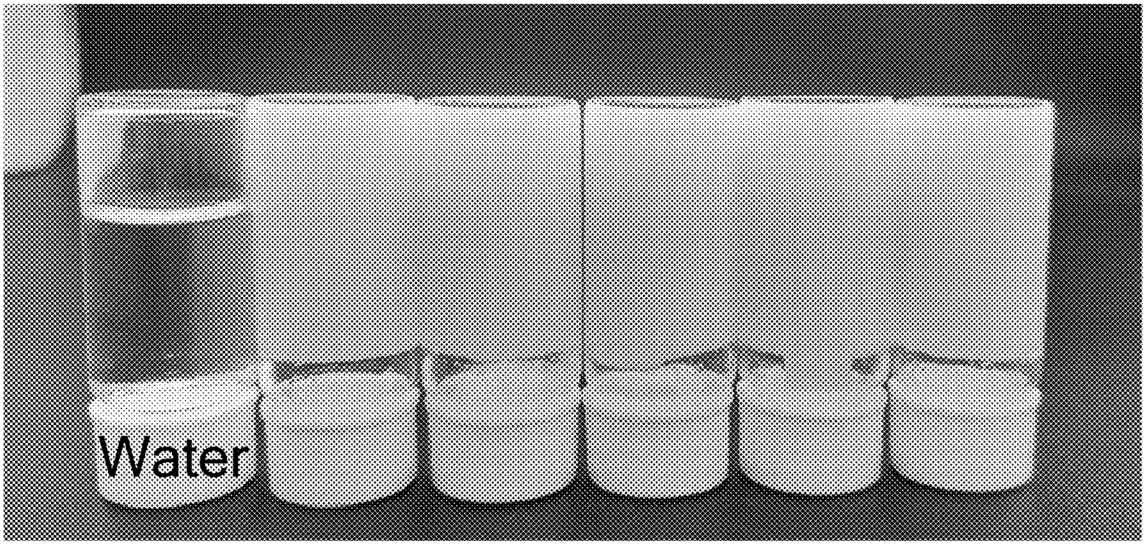
FIGS. 1A-1C show a physical picture, an optical microscope image, and a confocal microscope image of the O/W emulsion gel prepared in Example 1, respectively.

The present disclosure provides an O/W emulsion gel, including:

i. starch nanoparticles with a content of 8 g/L to 40 g/L, curdlan with a content of 10 g/L to 30 g/L,
ii. an oil with a volume fraction of 10% to 30%, and
iii. water.

In the present disclosure, the emulsion gel has excellent stability through a Pickering mechanism. The Pickering mechanism refers to the construction mechanism of a new green emulsion that uses solid particles instead of small-molecule surfactants to establish packaging on the droplet surface. Specifically, the starch nanoparticles serve as a stabilizer for the emulsion gel, and are combined with the curdlan to prepare the O/W emulsion gel with a better stability. The O/W emulsion gel could be used to prepare a fat substitute, especially the fat substitute prepared by 3D printing with various complex models. The 3D printing shows a high printing accuracy and a high printing intensity to achieve a desirable simulated effect of fats. The O/W emulsion gel of the present disclosure will be described in detail below.

In the present disclosure, unless otherwise specified, the raw materials used are all commercially-available commodities well known to those skilled in the art or prepared by methods well known to those skilled in the art.

In the present disclosure, the O/W emulsion gel includes the starch nanoparticles as one of raw materials for preparation. Based on the raw materials, the starch nanoparticles have a content of 8 g/L to 40 g/L, preferably 15 g/L to 35 g/L, and more preferably 25 g/L to 32 g/L. In some embodiments, the starch nanoparticles each have a particle size of 100 nm to 500 nm. In the present disclosure, the starch nanoparticles serve as a stabilizer for the emulsion gel, and are combined with the curdlan to prepare the O/W emulsion gel with improved stability. In some embodiments, the starch nanoparticles are prepared by a nanoprecipitation method, specifically including the following steps:

i. mixing a natural starch with a NaOH solution, and performing third homogenization to obtain a natural starch paste;
ii. adding the natural starch paste dropwise into ethanol, and performing fourth homogenization and precipitation in ethanol, to obtain a mixture after precipitation; and
iii. centrifuging the mixture after precipitation, collecting a resulting precipitate, and subjecting the resulting precipitate washing, drying, grinding, and sieving sequentially to obtain the starch nanoparticles.

In some embodiments of the present disclosure, a natural starch is mixed with a NaOH solution, and a resulting mixture is subjected to third homogenization to obtain a natural starch paste. In some embodiments, the natural starch includes at least one of corn starch, tapioca starch, and rice starch, and preferably is the corn starch, the tapioca starch, or the rice starch. In some embodiments, the NaOH solution has a concentration of 0.01 g/mL to 0.05 g/mL, and preferably 0.01 g/mL to 0.03 g/mL. In some embodiments, a ratio of the natural starch to the NaOH solution is in a range of (2-10) g:100 mL, and preferably (4-5) g:100 mL. In some embodiments, the third homogenization is conducted at a rotation speed of 1,500 rpm to 3,000 rpm, and preferably 2,500 rpm to 3,000 rpm. In some embodiments, the third homogenization is conducted for 1 minute to 3 minutes, and preferably 2 minutes to 3 minutes.

In some embodiments of the present disclosure, after obtaining the natural starch paste, the natural starch paste is added dropwise into ethanol, and a resulting mixture is subjected to fourth homogenization and precipitation in ethanol, to obtain a mixture after precipitation. In some embodiments, the ethanol is anhydrous ethanol. In some embodiments, a volume ratio of the natural starch paste to the ethanol is in a range of 1:1, 1:2 or 1:3, and preferably 1:1 or 1:2. In some embodiments, the natural starch paste is added dropwise to the ethanol. In some embodiments, the fourth homogenization is conducted at a rotation speed of 3,000 rpm to 15,000 rpm, and preferably 10,000 rpm to 15,000 rpm. In some embodiments, the fourth homogenization is conducted for 2 minutes to 5 minutes, and preferably 4 minutes to 5 minutes, and the time accounts after the dropwise addition of the natural starch paste is completed. In some embodiments, the natural starch paste is added dropwise to the ethanol at a rotational speed the same as the fourth homogenization, and after the dropwise addition is completed, the fourth homogenization is conducted at the rotational speed. The fourth homogenization is performed under the above conditions to promote the formation of the starch nanoparticles.

In some embodiments of the present disclosure, after obtaining the mixture after precipitation, the mixture after precipitation is centrifuged, and a resulting precipitate is collected, and subjected to washing, drying, grinding, and sieving sequentially to obtain the starch nanoparticles. In some embodiments of the present disclosure, the centrifugation is conducted at a rotation of 1,000 rpm to 2,000 rpm, and preferably 1,500 rpm to 2,000 rpm. In some embodiments, the centrifugation is conducted for 5 minutes to 10 minutes, and preferably 8 minutes to 10 minutes. In some embodiments, a reagent for the washing is ethanol, and preferably absolute ethanol. In some embodiments, the drying is conducted at a temperature of 35° C. to 75° C., and preferably 40° C. to 50° C. There is no special limitation to a drying time, as long as sufficient drying is ensured. There are no special restrictions on the grinding and the sieving, as long as the starch nanoparticles that meet particle size requirements could be obtained. In examples of the present disclosure, a 200-mesh sieve is used for sieving.

In the present disclosure, the O/W emulsion gel includes the curdlan as one of raw materials for preparation. Based on the raw materials, the curdlan has a content of 10 g/L to 30 g/L, preferably 15 g/L to 25 g/L, and more preferably 20 g/L. In some embodiments, the curdlan includes at least one of carrageenan, xanthan gum, and gellan gum, and preferably is the carrageenan, the xanthan gum, or the gellan gum. In some embodiments, the curdlan shows a high gelation speed and a desirable gelation effect.

In the present disclosure, the O/W emulsion gel includes the oil as one of raw materials for preparation. Based on the raw materials, the oil has a volume fraction of 10% to 30%, preferably 15% to 25%, and more preferably 20%. In some embodiments, the oil includes at least one of soybean oil, corn oil, peanut oil, sesame oil, wheat germ oil, and fish oil, and preferably is the soybean oil, the corn oil, the peanut oil, the sesame oil, the wheat germ oil, or the fish oil.

In the present disclosure, the O/W emulsion gel includes water as one of raw materials for preparation, and the water is used in an amount sufficient to ensure that the contents of the starch nanoparticles and the curdlan and the volume fraction of the oil meet the above requirements.

In the present disclosure, the O/W emulsion gel includes oil droplets formed from the oil. In some embodiments, the oil droplets each have a size of 5 μm to 60 μm.

The present disclosure further provides a method for preparing the O/W emulsion gel, including the following steps:

i. mixing the starch nanoparticles with the water to obtain a first mixture, and performing first homogenization on the first mixture to obtain a nanoscale starch dispersion;
ii. mixing the nanoscale starch dispersion with the oil to obtain a second mixture, and performing second homogenization on the second mixture to obtain an O/W emulsion; and
iii. mixing the O/W emulsion with the curdlan to obtain a third mixture, and performing gelation on the third mixture to obtain the O/W emulsion gel.

In the present disclosure, the starch nanoparticles are mixed with the water, and a resulting mixture is subjected to first homogenization to obtain a nanoscale starch dispersion. In some embodiments, the first homogenization is conducted at a rotation speed of 12,000 rpm to 16,000 rpm, and preferably 15,000 rpm. In some embodiments, the first homogenization is conducted for 2 minutes to 5 minutes, and preferably 3 minutes.

In the present disclosure, after obtaining the nanoscale starch dispersion, the nanoscale starch dispersion is mixed with the oil, and a resulting mixture is subjected to second homogenization to obtain an O/W emulsion. In some embodiments, the second homogenization is conducted at a rotation speed of 12,000 rpm to 16,000 rpm, and preferably 15,000 rpm. In some embodiments, the second homogenization is conducted for 2 minutes to 5 minutes, and preferably 3 minutes. In the O/W emulsion, the oil is a dispersed phase, and the nanoscale starch dispersion is a continuous phase.

In the present disclosure, the O/W emulsion is mixed with the curdlan, and a resulting mixture is subjected to gelation to obtain the O/W emulsion gel. In some embodiments, the O/W emulsion and the curdlan are mixed under stirring. In some embodiments, the stirring is conducted at a rotation speed of 100 rpm to 120 rpm, and preferably 110 rpm. In some embodiments, the stirring is conducted for 1 minute to 2 minutes. In some embodiments, the gelation is conducted at a temperature of 70° C. to 80° C., and preferably 70° C. to 75° C. In some embodiments, the gelation is conducted for 50 minutes to 70 minutes, and preferably 55 minutes to 60 minutes. During the gelation, the curdlan is gradually dissolved in the O/W emulsion and adheres to each other to form a gel grid. In some embodiments, the method further includes, after the gelation is completed, cooling a material obtained from the gelation to room temperature. There is no special limitation on a cooling means, and water bath cooling or natural cooling at room temperature may be adopted. In some embodiments, the O/W emulsion and the curdlan are mixed, heated in a water bath, and subjected to gelation, and a resulting product is then naturally cooled to room temperature to obtain the O/W emulsion gel.

The present disclosure further provides use of the O/W emulsion gel described in above technical solutions or the O/W emulsion gel prepared by the method described in above technical solutions in preparation of a fat substitute. In some embodiments, the preparation of the fat substitute includes performing 3D printing. A customized fat substitute product with certain self-supporting properties could be obtained through 3D printing. In some embodiments, a process for preparing the fat substitute using the O/W emulsion gel through 3D printing includes the following steps:

i. preheating the O/W emulsion gel to a fluid state and then feeding into a 3D printing needle tube;
ii. adjusting a printing nozzle to a predetermined temperature and loading with a 3D printing needle, and adjusting an X-axis, a Y-axis, and a Z-axis of a 3D printer to zero through program settings;
iii. designing a 3D model with data modeling software, and generating corresponding layers of three-dimensional slices with slicing software to obtain a slice model; calculating a path of each layer of the three-dimensional slices using a programming G code and importing the path into the 3D printer; and
iv. performing 3D printing by air pump extrusion or mechanical extrusion using the 3D printer according to preset 3D printing parameters, to obtain the fat substitute.

In the present disclosure, the O/W emulsion gel is preheated to a fluid state and then fed into a 3D printing needle tube. There is no particular limitation to a preheating temperature, as long as the O/W emulsion gel is heated to a flowing state. In some embodiments, the O/W emulsion gel in a flowing state is fed into the 3D printing needle tube without introducing air bubbles, while ensuring that the O/W emulsion gel in the 3D printing needle tube is uniform and in non-stratified state. In some embodiments, the 3D printing needle tube has a capacity of 10 mL. In some embodiments, a needle of the 3D printing needle tube is a tapered needle. In some embodiments, the needle has a diameter of 0.26 mm to 0.6 mm.

In the present disclosure, a printing nozzle is adjusted to a predetermined temperature and loaded with a 3D printing needle, and an X-axis, a Y-axis, and a Z-axis of a 3D printer are adjusted to zero through program settings. In some embodiments, the printing nozzle is at a temperature of 4° C. to 35° C., and preferably 10° C. to 25° C.

In the present disclosure, a 3D model is designed with data modeling software, and corresponding layers of three-dimensional slices are generated with slicing software to obtain a slice model; a path of each layer of the three-dimensional slices is calculated using a programming G code and the path is imported into the 3D printer. In some embodiments, the data modeling software is CAD 2007 version, and the 3D model exported is in STL (".stl") format. In some embodiments, the slicing software is slic3r version 1.3.1, and a file after slicing is in GCODE (".gcode") format.

In the present disclosure, 3D printing is performed by air pump extrusion or mechanical extrusion using the 3D printer according to preset 3D printing parameters, obtaining a fat substitute. In some embodiments, the 3D printing is conducted by the air pump extrusion. In some embodiments, the 3D printing parameters includes: a printing layer height of 0.2 mm to 0.4 mm, preferably 0.2 mm to 0.3 mm; a filling density of 80% to 100%, preferably 90% to 100%; an air pump extrusion pressure of 10 kPa to 25 kPa, preferably 10 kPa to 20 kPa; and a printing speed of 8 mm/s to 15 mm/s, preferably 9 mm/s to 11 mm/s.

The present disclosure further provides a fat substitute, wherein the fat substitute is prepared from the O/W emulsion gel as described in above technical solutions or the O/W emulsion gel prepared by the method as described in above technical solutions through 3D printing. In some embodiments of the present disclosure, a process and operating conditions for preparing the fat substitute using the O/W emulsion gel through the 3D printing are consistent with the above technical solutions, and will not be repeated here.

The technical solutions of the present disclosure will be clearly and completely described below with reference to the examples of the present disclosure. Apparently, the described examples are merely a part rather than all of the examples of the present disclosure. All other examples obtained by those skilled in the art based on the examples of the present disclosure without creative efforts shall fall within the scope of the present disclosure.

The characterization and performance testing methods involved in the following examples and comparative examples are as follows:

i. Optical microstructure test: a microstructure of the O/W emulsion gel is observed with an optical microscope (Leica dmi1).
ii. Confocal microstructure test: the microstructure of the O/W emulsion gel is observed using a laser confocal microscope (Leica TCS SP8), wherein an oil phase is stained with Nile red and appears red in the results.
iii. Rheological property test: a viscosity test is conducted in a shear rate range of 1-500 $s^{-1}$; a modulus test is conducted over an angular frequency range of 0.1 rad/s to 100 rad/s while maintaining a constant strain of 2%. Furthermore, all tests are conducted using an aluminum plate (with a diameter of 25 mm) at a gap value of 1 mm.
iv. Emulsion stability test: changes of an optical signal in the O/W emulsion gel is monitored every 45 s with an emulsion stabilization instrument (Turbiscan® Lab equipment, Formulation Smart Scientific Analysis), and a Turbiscan stability index (TSI) is calculated.

Example 1

5 g of a natural corn starch was mixed with 100 mL of a NaOH solution with a concentration of 0.01 g/mL, and a resulting mixture was sheared and homogenized at 3,000 rpm for 3 min, such that the natural corn starch was dissolved in the NaOH solution and completely gelatinized, obtaining a natural starch paste. 100 mL of the natural starch paste was added dropwise into 100 mL of absolute ethanol at 15,000 rpm, and after the adding dropwise was completed, a resulting mixture was homogenized at 15,000 rpm for 5 min. A resulting liquid was centrifuged at 2,000 rpm for 10 min. A resulting precipitate was washed with absolute ethanol, dried at 50° C., then ground and sieved to pass through a 200-mesh sieve, obtaining starch nanoparticles with a particle size of 100 nm to 500 nm.

The starch nanoparticles was mixed with water and a resulting mixture was homogenized at 15,000 rpm for 3 min, obtaining a nanoscale starch dispersion with a concentration of 4 wt. %.

20 mL of soybean oil was added to 80 mL of the nanoscale starch dispersion, and a resulting mixture was homogenized at 15,000 rpm for 3 min, obtaining an O/W emulsion, wherein in the O/W emulsion the soybean oil acted as a dispersed phase and the nanoscale starch dispersion acted as a continuous phase.

2 g of carrageenan was added to 100 mL of the O/W emulsion. A resulting mixture was stirred at 110 rpm for 2 min, heated in a 70° C. water bath for 1 h, and cooled to room temperature, obtaining an O/W emulsion gel.

Figure 1B:
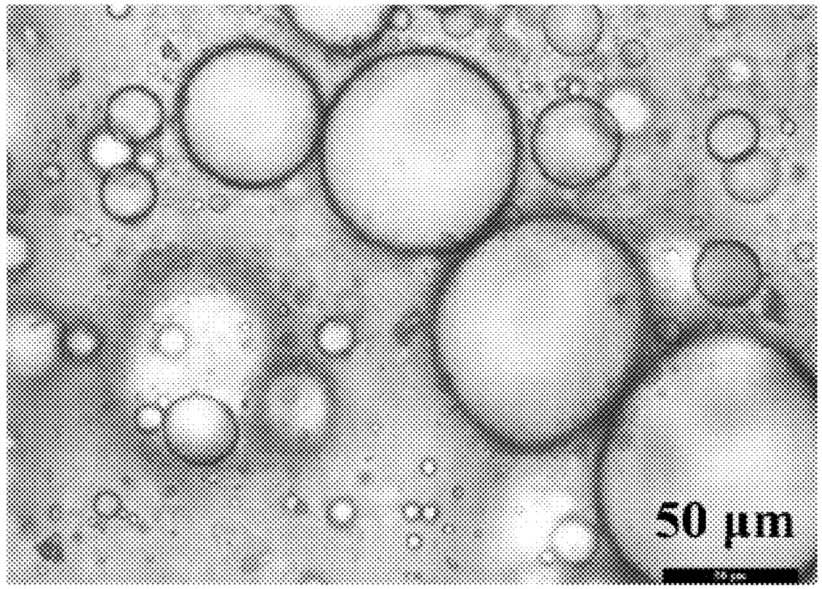
Figure 1C:
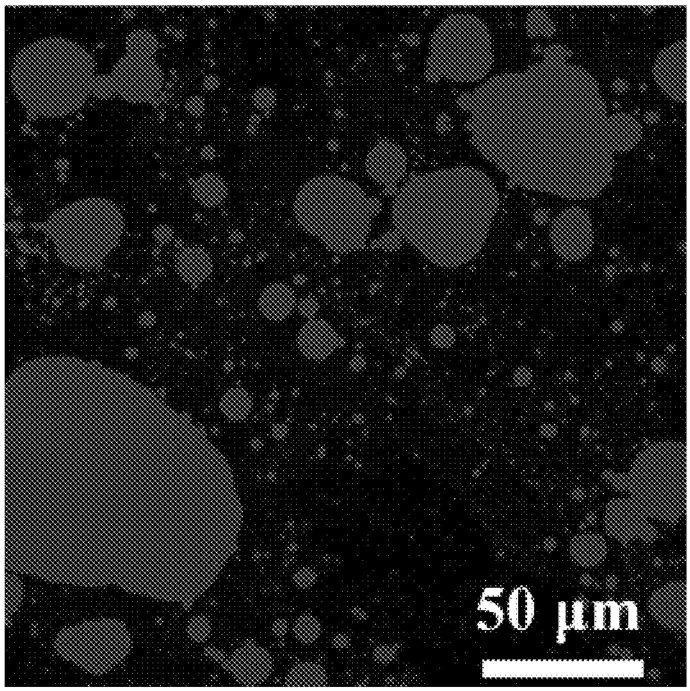

FIGS. 1A-1C show a physical picture, an optical microscope image, and a confocal microscope image of the O/W emulsion gel prepared in Example 1, in which FIG. 1A is the physical picture, FIG. 1B is the optical microscope image, and FIG. 1C is the confocal microscope image. As shown in FIG. 1A, the emulsion gel prepared in Example 1 exhibits semi-solid characteristics, does not flow when being inverted, and has a uniform milky white appearance, thereby achieving simulating fat effect in appearance. As shown in FIGS. 1B and 1C, the emulsion gel prepared in Example 1 is an O/W emulsion gel with an oil droplet size of 5 μm to 60 μm.

3D printing was performed on the O/W emulsion gel prepared in Example 1, which was performed according to the following procedures:

i. The O/W emulsion gel was preheated to a flowing state, and then fed into a 3D printing needle tube without introducing air bubbles, while ensuring that the O/W emulsion gel in the 3D printing needle tube was uniform and in a non-stratified state, wherein the 3D printing needle tube had a capacity of 10 mL and a tapered needle with a diameter of 0.26 mm.
ii. A printing nozzle was adjusted to 25° C. and loaded with a 3D printing needle, and an X-axis, a Y-axis, and a Z-axis of a 3D printer were reset to zero through program settings.
iii. A 3D model was designed with data modeling software, and corresponding layers of three-dimensional slices were generated with slicing software, obtaining a slice model. A path of each layer of the three-dimensional slices was calculated using a programming G code and the path was imported into the 3D printer, wherein the data modeling software was CAD 2007 version, and the 3D model exported was in stl format; the slicing software was slic3r version 1.3.1, and a file after slicing was in gcode format.
iv. 3D printing was conducted using the 3D printer by air pump extrusion according to preset 3D printing parameters, obtaining a fat substitute with self-supporting properties, wherein the 3D printing parameters consisted of: a printing layer height of 0.2 mm; a filling density of 100%; an air pump extrusion pressure of 20 kPa; and a printing speed of 11 mm/s.

Example 2

An O/W emulsion gel was prepared according to the method as described in Example 1, except that the soybean oil was replaced with fish oil.

3D printing was performed using the O/W emulsion gel prepared in this example according to the procedures as described in Example 1, except that the air pump extrusion pressure was 10 kPa.

Comparative Example 1

An O/W emulsion gel was prepared according to the method as described in Example 1, except that the nanoscale starch dispersion was replaced with water.

3D printing was performed using the O/W emulsion gel prepared in this comparative example according to the procedures as described in Example 1, except that the air pump extrusion pressure was 15 kPa.

Comparative Example 2

An O/W emulsion gel was prepared according to the method as described in Example 1, except that the starch nanoparticles were replaced with natural corn starch.

3D printing was performed using the O/W emulsion gel prepared in this comparative example according to the procedures as described in Example 1.

Test Example 1

Figure 2A:
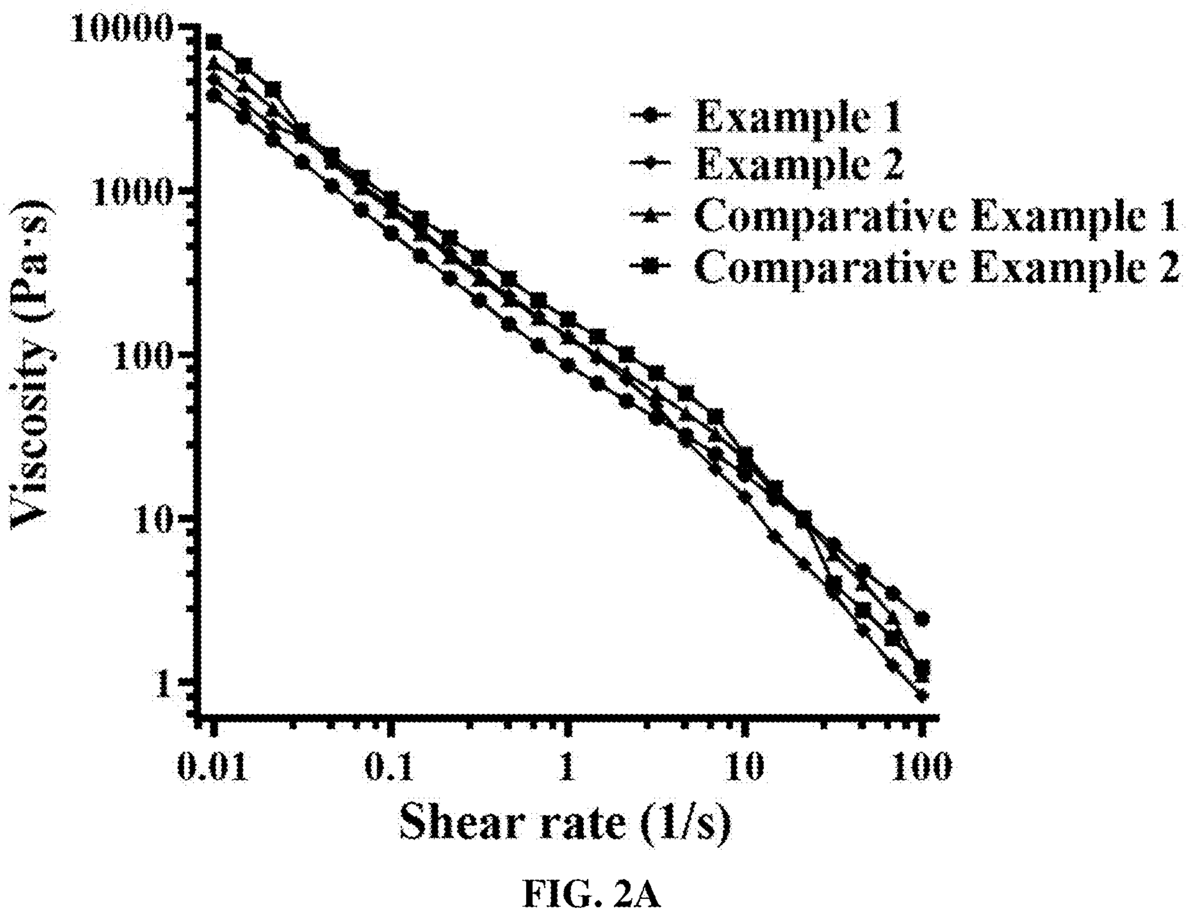
FIGS. 2A and 2B show comparisons among the O/W emulsion gels prepared in Example 1, Example 2, Comparative Example 1, and Comparative Example 2, in terms of rheological properties.
Figure 2B:
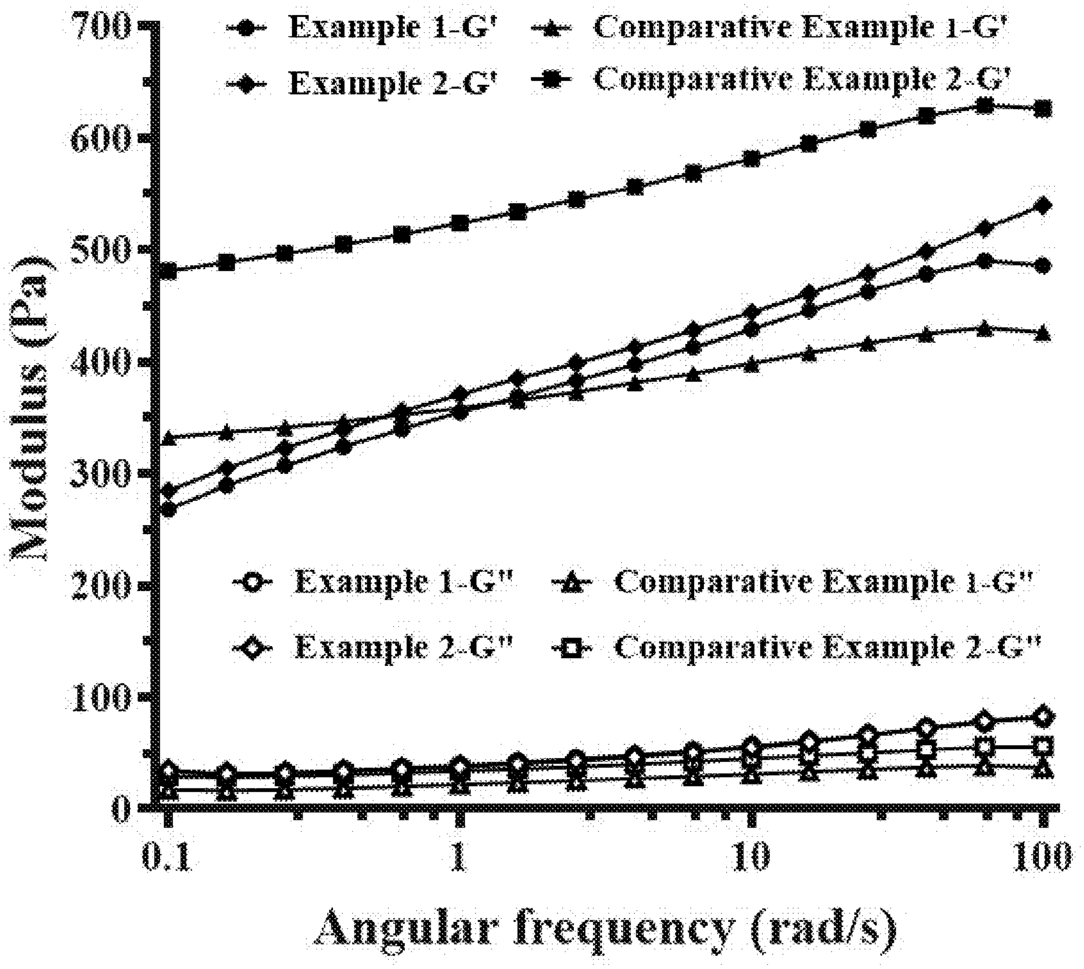

The emulsion gels prepared in Example 1, Example 2, Comparative Example 1, and Comparative Example 2 were subjected to a rheological property test. The results are shown in FIGS. 2A and 2B, in which FIG. 2A shows variations of the viscosity with shear rate, and FIG. 2B shows variations of the modulus with frequency. The relevant test data are shown in Table 1. As shown in FIG. 2A, the four emulsion gels prepared in Example 1, Example 2, Comparative Example 1, and Comparative Example 2 all exhibit desirable shear thinning properties and could be used for extrusion 3D printing. As shown in Table 1, the emulsion gels prepared in Example 1, Comparative Example 1, and Comparative Example 2 show a viscosity of 3,839.4 Pa·s, 8,092.8 Pa·s, and 6,109.6 Pa·s, respectively at a shear rate of 0.01 $s^{-1}$. This indicates that the addition of starch nanoparticles reduces the viscosity of the emulsion gel system, which allows the system to be extruded from an extrusion head more smoothly, thereby improving the accuracy of the 3D printing. A frequency sweep graph could reflect the internal structure information of printing ink, in which a storage modulus (G') represents the energy storage caused by elastic materials, while a loss modulus (G") reflects the energy loss caused by viscous deformation in rheology. As shown in FIG. 2B, G' and G" of the four emulsion gels prepared in Example 1, Example 2, Comparative Example 1, and Comparative Example 2 increase steadily with the increase of frequency, while G' is always greater than the G". This indicates that the emulsion gel mainly has elastic and solid properties and shows the ability of being used for 3D printing.

TABLE 1

Test results of rheological properties of emulsion gels prepared in examples and comparative examples

| Index | Example 1 | Example 2 | Comparative Example 1 | Comparative Example 2 |
|---|---|---|---|---|
| Static viscosity/Pa · s (shearing rate: 0.01 $s^{-1}$) | 3839.4 | 4807.8 | 6109.6 | 8092.8 |
| Static storage modulus G'/Pa (angular frequency of 0.01 rad/s) | 267.74 | 284.54 | 332.25 | 480.77 |
| Static loss modulus G"/Pa (angular frequency of 0.01 rad/s) | 33.753 | 34.442 | 17.623 | 29.479 |

Test Example 2

Figure 3:
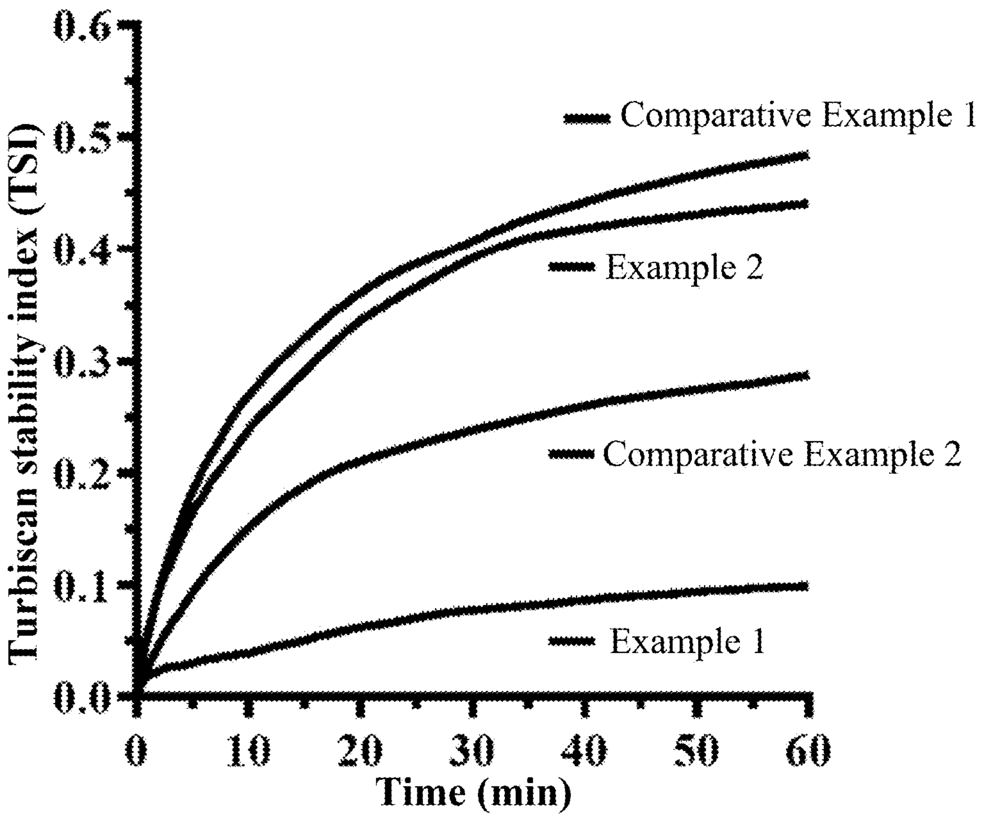
FIG. 3 shows a comparison among the O/W emulsion gels prepared in Example 1, Example 2, Comparative Example 1, and Comparative Example 2, in terms of emulsion stability.

The emulsion gels prepared in Example 1, Example 2, Comparative Example 1, and Comparative Example 2 were subjected to an emulsion stability test. The results are shown in FIG. 3 and Table 1. Turbiscan detected a backscattered light signal in real time and compared same with an initial value, and calculated a TSI through a built-in program. The TSI closer to 0 indicates better stability of the emulsion gel. As shown in FIG. 3, the TSI values of the four emulsion gels increase over time, indicating that the emulsion gels are slowly destabilizing. The emulsion gel prepared in Example 1 has the minimum TSI value, which is always less than 0.1, indicating that the emulsion gel has a high stability and is not prone to deformation and instability after long-term storage. On the contrary, the TSI values of the emulsion gels in Comparative Example 1 without starch nanoparticles and Comparative Example 2 with ordinary corn starch are both greater than 0.2, indicating that the emulsion gel prepared based on starch nanoparticles have a better stability, and could better maintain the shape and accuracy of 3D printed products.

Figure 4A:
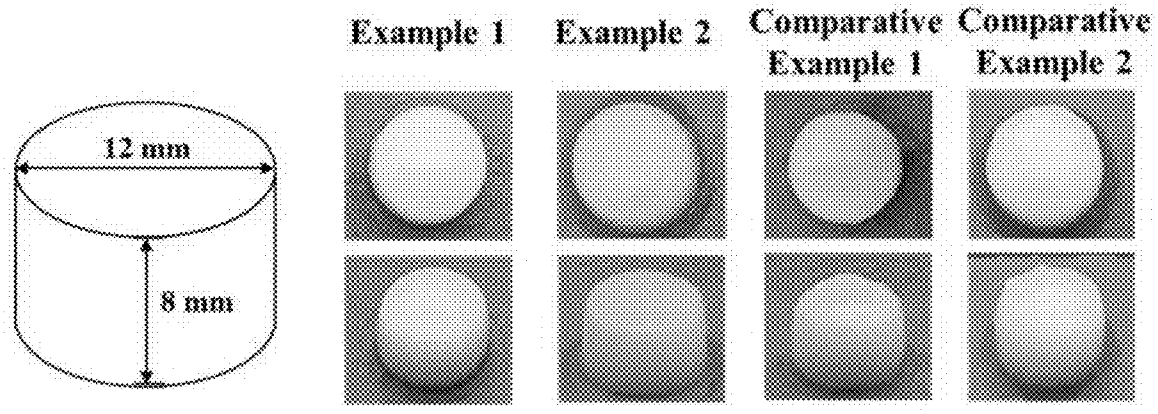
FIGS. 4A-4C show a comparison among 3D printed products prepared from the O/W emulsion gels prepared in Example 1, Example 2, Comparative Example 1, and Comparative Example 2.
Figure 4B:
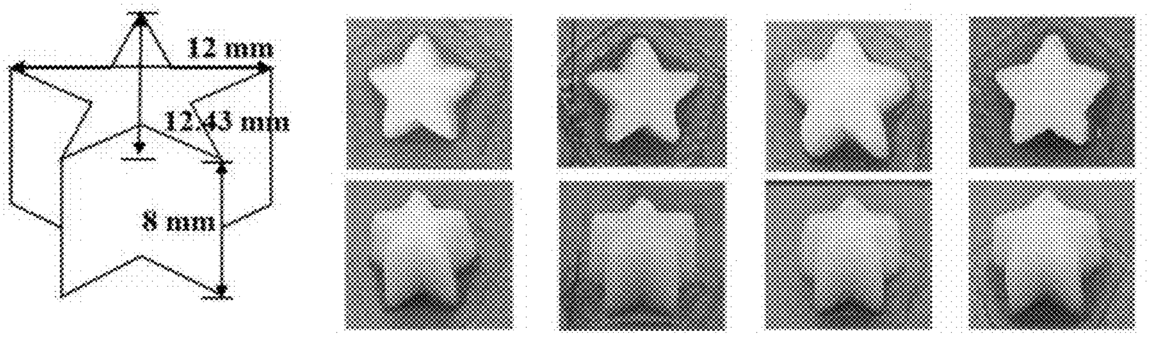
Figure 4C:
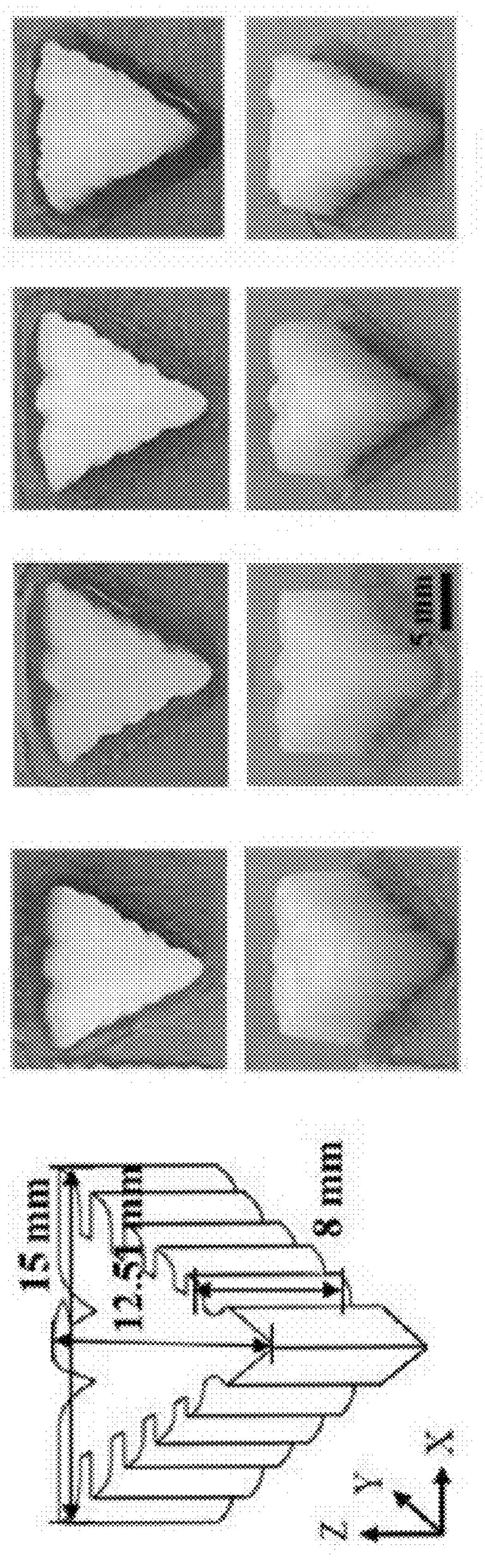

FIGS. 4A-4C show a comparison among 3D printed products prepared using the emulsion gels in Example 1, Example 2, Comparative Example 1, and Comparative Example 2. It can be seen that the emulsion gels in Example 1 and Example 2 both have desirable 3D printing performance and printing accuracy, and could successfully achieve the printing of smooth, high-accuracy circles, five-pointed stars, and the shape of the Zhejiang University emblem. However, when the emulsion gel prepared in Comparative Example 1 is used to 3D print circles and five-pointed stars, the printed products have rough tops with some lines being distorted. When using the emulsion gel prepared in Comparative Example 2 to print a Zhejiang University emblem model with complex details, the printed lines are uneven and the entire printed product has uneven surfaces, which adversely affect the visual aesthetics. The length, width, and height of the printed products of the examples and comparative examples were measured, calculated, and compared with the original printed models. The results are shown in Table 2. Example 1 has a printing accuracy of 94.33%±3.30%, while Comparative Example 1 and Comparative Example 2 have printing accuracy of 91.23%±2.89% and 88.70%±3.62%, respectively. This indicates that the O/W emulsion gel stabilized by starch nanoparticles in the present disclosure shows an excellent 3D printing performance and could meet various high-accuracy needs for food 3D printing.

TABLE 2

Test results of emulsion stability and printing accuracy of emulsion gels prepared in examples and comparative examples

| Index | Example 1 | Example 2 | Comparative Example 1 | Comparative Example 2 |
|---|---|---|---|---|
| Turbiscan stability index, TSI (time: 60 min) | 0.0991 | 0.4407 | 0.4836 | 0.2877 |
| 3D printing accuracy/% | 94.33 ± 3.30 | 92.83 ± 4.27 | 91.23 ± 2.89 | 88.70 ± 3.62 |

The above descriptions are merely preferred embodiments of the present disclosure. It should be noted that a person of ordinary skill in the art may further make several improvements and modifications without departing from the principle of the present disclosure, but such improvements and modifications should be deemed as falling within the scope of the present disclosure.

What is claimed is:

1. A method for preparing an oil-in-water (O/W) emulsion gel, the O/W emulsion gel comprising starch nanoparticles with a content of 8 g/L to 40 g/L, curdlan with a content of 10 g/L to 30 g/L, an oil with a volume fraction of 10% to 30%, and water, wherein the method comprises the steps of:

mixing the starch nanoparticles with the water to obtain a first mixture, and performing a first homogenization on the first mixture to obtain a nanoscale starch dispersion;

mixing the nanoscale starch dispersion with the oil to obtain a second mixture, and performing a second homogenization on the second mixture to obtain an O/W emulsion; and mixing the O/W emulsion with the curdlan to obtain a third mixture, and performing gelation on the third mixture to obtain the O/W emulsion gel, wherein the starch nanoparticles are prepared by a nano-precipitation method comprising:

mixing a natural starch with a NaOH solution, and performing a third homogenization to obtain a natural starch paste;

adding the natural starch paste dropwise into ethanol, and performing a fourth homogenization and precipitation in ethanol, to obtain a mixture after the precipitation; and centrifuging the mixture after the precipitation, collecting a resulting precipitate, and subjecting the resulting precipitate to washing, drying, grinding, and sieving sequentially to obtain the starch nanoparticles.

2. The method as claimed in claim 1, wherein the first homogenization and the second homogenization are each independently conducted at a rotation speed of 12,000 rpm to 16,000 rpm for 2 minutes to 5 minutes.

3. The method as claimed in claim 1, wherein the gelation is conducted at a temperature of 70° C. to 80° C. for 50 minutes to 70 minutes.

4. The method as claimed in claim 2, wherein the gelation is conducted at a temperature of 70° C. to 80° C. for 50 minutes to 70 minutes.

5. The method as claimed in claim 1, wherein the starch nanoparticles each have a particle size of 100 nm to 500 nm.

6. The method as claimed in claim 1, wherein the curdlan comprises at least one selected from the group consisting of carrageenan, xanthan gum, and gellan gum.

7. The method as claimed in claim 1, wherein the oil comprises at least one selected from the group consisting of soybean oil, corn oil, peanut oil, sesame oil, wheat germ oil, and fish oil.

8. The method as claimed in claim 1, wherein the NaOH solution has a concentration of 0.01 g/mL to 0.05 g/mL.

9. The method as claimed in claim 1, wherein a ratio of the natural starch to the NaOH solution is in a range of 2-10 g:100 mL.

* * * * *